No. 894,620. PATENTED JULY 28, 1908.
J. J. FRANK.
TRANSFORMER.
APPLICATION FILED OCT. 21, 1907.
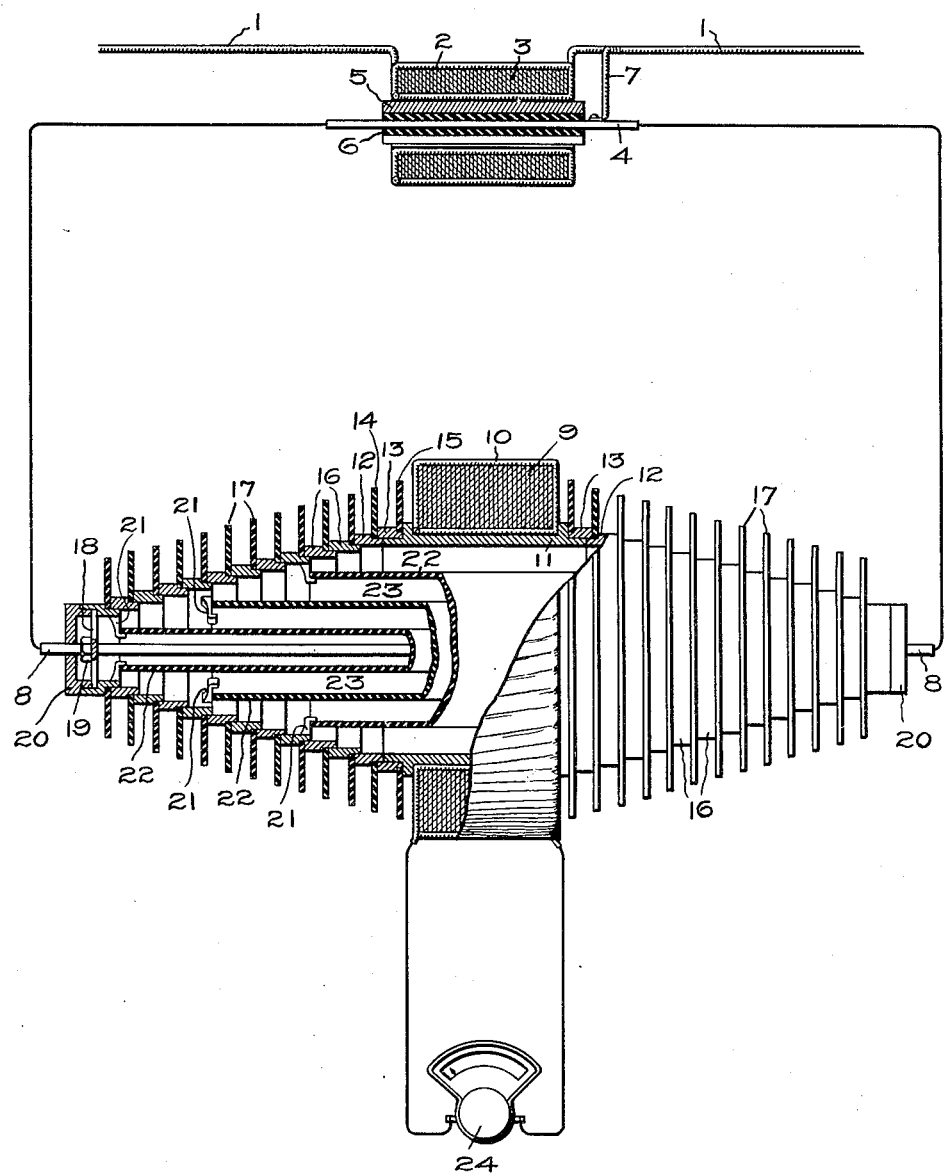
Witnesses
J. Ellis Glen.
Marcus L. Byng.
Inventor
John J. Frank
by
Atty.

UNITED STATES PATENT OFFICE.

JOHN J. FRANK, OF SCHENECTADY, NEW YORK, ASSIGNOR TO GENERAL ELECTRIC COMPANY, A CORPORATION OF NEW YORK.

TRANSFORMER.

No. 894,620.  Specification of Letters Patent.  Patented July 28, 1908.

Application filed October 21, 1907. Serial No. 398,403.

*To all whom it may concern:*

Be it known that I, JOHN J. FRANK, a citizen of the United States, residing at Schenectady, county of Schenectady, State of New York, have invented certain new and useful Improvements in Transformers, of which the following is a specification.

My invention relates to transformers, but more especially to that class of transformers used for the purpose of measuring the energy in very high-voltage electric circuits and relates especially to "current transformers" which are used in connection with suitable measuring devices to measure the quantity of current flowing in a circuit.

One object of my invention is to decrease the cost, size and weight of current transformers used for measuring the current in high-voltage circuits.

Another object is to produce a form of transformer in which the high-voltage windings may be capable of a more perfect insulation than has been the case in the form of transformer used up to the present time, and thus to eliminate failures in the insulation of the transformer and better protect the meters used with these transformers from the high line voltage and thus also to better protect the attendants who may be called upon to use these meters.

In the present stage of development of the electrical industry the use of high voltage, for example, 60,000 volts and above, is becoming more and more prominent, and the problems arising in connection with the proper insulation of electric circuits carrying these high voltages have become very difficult ones. This is especially true of those portions of a high-voltage electric system that are not used directly for the transmission of electric energy, but are rather auxiliary thereto; for example, the devices used for measuring the current, voltage, etc., in the various parts of the system. These devices must be made of such a character that they may be safely subjected to the high potentials of the system, but it is also most essential that they should be as cheap and as small as possible for in a large system there may be a great number of such devices employed and since they are a relatively small portion of the system their cost and bulk in comparison with that of the entire system should also be relatively small to avoid too great a proportional outlay for them.

While current transformers are made and used with circuits of high voltage, when the voltage becomes very high these transformers become large and expensive for the reason that to provide sufficient insulation for the high voltages the various parts of the transformers must be made correspondingly large. My invention seeks to provide a simple and cheap means of transforming the high-voltage line current to one suitable for a measuring instrument. For this purpose I use a current transforming device consisting of two transformers, the primary of one of which is wound with a large number of turns and is connected in series with the conductor whose current it is desired to measure, while the secondary consists of a straight rod or bar. The second transformer has a primary consisting also of a straight rod or bar in series with the secondary of the first transformer, while its secondary is wound with a large number of turns and connected to the meter.

The first transformer may be wound with a large ratio of transformation, for example, 300 or 400 to 1. The secondary will then have induced in it a large current, for example, 1500 to 2000 amperes. The second transformer is also wound for a large ratio of transformation so that its secondary current will be small and suitable for the usual type of ammeter used.

The first transformer may be small and may have its primary and secondary windings electrically connected together, so that the only insulation necessary between the two windings is that of the potential drop across the transformer itself, while the second transformer has its windings insulated for the very high voltage, or the transformers may be reversed; that is, the high-voltage insulation transformer may be connected to the main line circuit, while the low-voltage insulation transformer is connected to the meter. I use this arrangement of transformers so that I may have one of the windings of the transformer a straight rod or bar which permits of a better insulation than when it becomes necessary to insulate a number of turns. I find that I cannot use one transformer of this type connecting one winding in series with the line and the other to the meter for the reason that the windings of the transformer must be separated by a considerable distance to insure proper insulation for the high voltage. The current flowing in the primary is, however, small; for example, a line of 60,000 volts transmitting 1200 KVA will have 20 amperes flowing in it. If a 5-ampere meter with a suitable scale be used, the ratio of turns would be 4:1, so that for a single-turn primary there would only be four secondary turns. With the necessarily large distances between turns there is a correspondingly large magnetic leakage and hence the ratio of transformation will not be correct and the meters will read inaccurately. Furthermore, with the small number of turns, unless there is an air-gap in the core, the core flux density may be detrimentally great. By employing a transforming device consisting of two transformers I avoid these conditions, for I use one transformer with a large number of primary turns and one secondary turn, and since this transformer need not be highly insulated, the windings may be close together and but little leakage will occur. The single turn winding will have induced in it a very large current, for example, 1600 amperes, and the second transformer having this large current flowing in one winding may have its windings sufficiently separated to insure good insulation without causing undue leakage, and thus an inaccuracy in the meter readings, and both transformers having a large number of turns in one winding will not have too great a core flux density.

In the accompanying drawing attached to and made a part of this specification, I have shown a form in which my invention may be carried out, showing one of the conductors of a circuit whose current it is desired to measure, the two measuring transformers, one in section and one partially in section and partially in elevation to obtain a better understanding of the construction of the transformer, and the meter.

Referring more particularly to the drawings, 1 represents a conductor of the circuit whose current it is desired to measure. Connected in any suitable manner to this and in series with it is the primary winding of the transformer 2, which is wound around a core 3 formed in the usual manner of laminæ of steel or iron. This core is formed of a number of sheets which have a central hole which may be circular in shape or of any shape, but I prefer to make it circular for convenience of manufacture. The periphery of the sheets may be circular or polygonal, or any shape, so that they have substantially the same diametral dimension when measured in all directions. I prefer, however, to make them circular. The winding 2 is wound around the core at right angles to the faces of the laminæ. 4 shows the secondary winding, consisting of a bar or rod passing through the core and through its longitudinal axis. This bar may be insulated from the core in any suitable fashion, but I prefer to use a tube 5 of porcelain or any insulating material closely fitting inside the winding 2. Between this tube and the bar 4 may be poured a liquid insulating material 6, which upon hardening will keep the bar in place, or the bar may be held in place and insulated in any well known fashion, as above pointed out. The bar 4 need not be insulated from the line circuit and I have shown a connection 7 between the conductor 1 and the transformer secondary 4.

I have shown the second transformer as having its windings insulated for the high-line voltage, and well separated from each other. While the insulation of the windings from each other may be performed in any well known manner, I prefer to employ the method of insulation illustrated in the accompanying drawing. As will be further described in detail, I insert the straight conductor winding within the core and make it of sufficient length so that its ends will extend well beyond the end surfaces of the core and the winding surrounding it, to give a long voltage creepage distance. I surround this single turn winding with a number of tubes of an insulating material to insulate it from the core and the other winding, and to further increase the creepage distance between the ends of the single conductor winding and the end surfaces of the core and the other winding, I insert between them a number of interlocking annuli and outwardly extending disks.

In series with 4 is the primary 8 of a second transformer, 8 being a straight rod or bar of a conducting material. Concentric to 8 is shown a core 9 formed of iron or steel laminæ, this core being preferably of annular sheets built up to form a hollow cylinder. It may be understood, however, that these sheets may be polygonal or of any desired shape if they have substantially the same diametral dimension in all directions, and the hole formed in them may be also polygonal, but I prefer for ease in construction to form these sheets as annuli. Around the core thus built up are wound a number of turns 10 to form the secondary of the transformer. The secondary winding and core thus formed are then placed so their longitudinal axis is the same as that of the rod 8 and substantially at the center of the rod 8. Closely within the winding 10 and concentric to it I have shown the tube 11 which may be formed of fiber, porcelain or any suitable insulating material. The ends of tube 11 are shown as thinned down in section, and closely fitting the thin portions of the ends I have shown the short annuli 12 which are concentric to 8. Annuli 12 have the end adjoining cylinder 11 thinned down so that it shall have the same external diameter as that of the external diameter of the end cylinder 11 and surrounding and closely fitting the ends of the two cylinders I have shown the rings 13. These rings do not, however, closely fit the shoulders formed on the ends of 12 and 11, but have spaces between them into which spaces fit disks 14 and 15 formed of fiber or any suitable insulating material and held in position by friction between the rings, from the construction of the rings as shown. I have shown annuli 16 all of the same shape of section but of diameters progressively smaller as they progress toward the end of rod 8. Each of these annuli has a shoulder formed at one end by diminishing the thickness of the ring so that the thin portion of the end may closely fit inside the ring adjoining it but of larger diameter. These annuli are not assembled so that the shoulder of the one fits closely against the end of the other, but a space is left between in which fit disks 17, these disks being of progressively smaller diameter as they approach the end of rod 8. So many of these rings and disks as desired may be used; the end annuli, which is of quite a small diameter, being formed with an internal shoulder against which rests a plate 18, against which is screwed a nut 19, a screw-thread being formed on the end of rod 8 for this purpose. It will be understood that as the assembling of annuli and disks is symmetrical with respect to the center tube 11 when nuts 19 at each end of rod 8 are screwed up so that plates 18 bear firmly against the end ring, by their structure all of the annuli and disks will be locked firmly in position and a rigid structure of the core, primary and secondary windings and insulating annuli will result. Caps 20 are shown which may be fastened in any well known manner to the last ring or rod 8 for preventing dirt, etc., getting into the transformer.

Fastened to the interior of certain of the annuli I have shown hooks or supports 21 which hold tubes 22 formed of a suitable insulating material, these tubes being concentric to the rod 8 and of less diameter and longer the more nearly they approach rod 8. It will be understood that these tubes will be locked into position by the action of nuts 19. Between the tubes I have shown spaces 23 which may be filled with air or a suitable insulating fluid for further increasing the insulation. In series with 10 I have shown an ammeter 24 of any suitable type for measuring the current in this winding and hence the current in conductor 1.

While I have shown one form of my invention, I do not limit myself to this form shown, but my invention may be applied in many forms which may suggest themselves to those skilled in the art. For example, the position of the transformers may be reversed so that the conductor 1 may be connected to the secondary winding 10 of the highly insulated transformer, while the meter is connected to winding 2 of the other transformer. Or, if desired, other forms of high-voltage transformer insulation may be used, or both transformers may be insulated for high-voltage; or the moderately insulated transformer may have its secondary consisting of more than one turn.

What I claim as new, and desire to secure by Letters Patent of the United States, is,—

1. A current transforming device for electric circuits comprising in combination a step-up current transformer having its primary and secondary windings in close inductive relation, and a step-down current transformer connected in series therewith and having its primary and secondary windings spaced apart to secure proper insulation between them.

2. A current transforming device for electric circuits comprising in combination two current transformers, each having two windings one of which consists of a single turn, the single turn windings being connected in series.

3. A current transforming device for electric circuits comprising in combination two current transformers, one stepping the current down the other stepping the current up, one winding of one transformer being connected in series with one winding of the other transformer, one transformer consisting of a hollow cylindrical core, a winding about said core, a second winding consisting of a straight conductor passing through the center of said core and winding, extending longitudinally beyond said core and winding and insulated therefrom by a plurality of annular members surrounding said conductor and extending longitudinally from the core, successive annuli being of successively less diameter and each annulus having one of its ends necked so it may partially slide within the annulus adjacent and larger, and holding between it and said larger annulus an insulating disk, a plurality of concentric tubes surrounding said conductor and within the annuli, the structure being locked in place by plates and nuts on each end of said conductor.

4. In combination, an electric circuit, a transformer with a greater number of turns in one winding than in a second winding, the greater turn winding being connected in series with a conductor of the circuit, a second transformer with a greater number of turns in one winding than in a second winding, the lesser turn winding being connected in series with the lesser turn winding of the first transformer, and a measuring device in series with the greater turn winding of the second transformer for measuring the current in the circuit.

5. In combination, an electric circuit, two transformers, each having a core, one winding consisting of a single turn and a second winding consisting of many turns, the two single-turn windings being connected in series, the many-turn winding of one transformer being connected to one conductor of the circuit, and the many-turn winding of the other transformer being connected to a suitable measuring device for measuring the current in the circuit.

6. In combination, a high-voltage electric circuit, an ammeter, and two transformers, each having a greater number of turns in one winding than in a second winding, one transformer having a sufficiency of insulation between its two windings to protect one winding from the voltage of the other, the lesser-turn windings of the two transformers being connected in series, the greater-turn winding of one transformer being connected in series with a conductor of the electric circuit, the greater-turn winding of the second transformer being connected in series with the ammeter for measuring the current in the circuit.

7. In combination, a high-voltage electric circuit, an ammeter, and two transformers, each having a core and two windings, one winding consisting of a straight conductor and the other winding of a plurality of turns, one transformer having its windings so insulated from each other that when one winding is subjected to the full line potential the other winding will be insulated therefrom, the single-turn windings of the two transformers being connected in series and the many-turn winding of one transformer being connected in series to a conductor of the circuit, the many-turn winding of the other transformer being connected to the ammeter for measuring the current in the circuit.

8. In combination, a high-voltage electric circuit, an ammeter, and two transformers, each having a core and two windings, one winding consisting of a straight conductor and the other winding of a plurality of turns, one transformer having its straight conductor winding insulated from its many-turn winding by a plurality of tubes of varying diameters inclosing said straight conductor and between it and the many-turn winding, the straight conductor windings of the two transformers being connected in series, the many-turn winding of one transformer being connected in series with a conductor of the circuit and the many-turn winding of the other transformer being connected to the ammeter for measuring the current in the circuit.

9. In combination, an electric circuit, an ammeter and two transformers, each transformer consisting of a hollow cylindrical magnetic core, a winding of a plurality of turns about said core and forming substantially a hollow cylinder inclosing said core, and a second winding consisting of a straight conductor passing through the center of said core and its inclosing winding and insulated therefrom, the single turn windings of the two transformers being connected in series, the many-turn winding of one transformer being connected to a conductor of the circuit, and the many-turn winding of the second transformer being connected to the ammeter for measuring the current in the circuit.

10. A current transformer consisting of a hollow cylindrical core, a winding about said core, a secondary winding consisting of a conductor passing through the center of said core and winding, and an insulation consisting of a plurality of annular members surrounding said conductor and between it and the core.

11. A current transformer consisting of a hollow substantially cylindrical core, a winding about said core, a second winding consisting of a straight conductor passing through the center of said core and winding, extending longitudinally beyond said core and winding and insulated therefrom by a plurality of tubes of varying diameters inclosing said conductor, and a plurality of interlocking annular members surrounding said conductor extending longitudinally from the core and held in position by means of said conductor.

12. A current transformer consisting of a hollow cylindrical core, a winding about said core, a second winding consisting of a straight conductor passing through the center of said core and winding, extending longitudinally beyond said core and winding and insulated therefrom by a plurality of annular members surrounding said conductor and extending longitudinally from the core, successive annuli being of successively less diameter and each annulus having one of its ends necked so it may partially slide within the annulus adjacent and larger, and holding between it and said larger annulus an insulating disk, a plurality of concentric tubes surrounding said conductor and within the annuli, the structure being locked in place by plates and nuts on each end of said conductor.

13. In combination, a high-voltage electric circuit, a current transformer consisting of a hollow cylindrical core, a winding about said core in series with a conductor of the circuit, a second winding consisting of a straight conductor passing through the center of said core and winding, and a second current transformer consisting of a hollow cylindrical core, a winding about said core in series with an ammeter, a second winding consisting of a straight conductor in series with the straight conductor winding of the first transformer and insulated from its core and secondary winding by a plurality of concentric tubes inclosing said conductor and a plurality of annuli surrounding said conductor and extending longitudinally from the ends of the core, successive annuli being of successively less diameter and necked at one end so as to partially fit within the adjacent larger annulus, insulating disks held between adjacent annuli, the annuli, tubes, core and windings being locked into place by plates pressing against the terminal annuli and held in position by nuts on the ends of the straight conductor.

In witness whereof, I have hereunto set my hand this 19th day of October, 1907.

JOHN J. FRANK.

Witnesses:
MARGARET E. WOOLLEY,
HELEN ORFORD.